(12) United States Patent
Fayolle

(10) Patent No.: US 8,262,843 B2
(45) Date of Patent: Sep. 11, 2012

(54) METHOD OF APPLYING MULTI-LAYER STRUCTURE ONTO A CURVED SUBSTRATE

(75) Inventor: Romain Fayolle, Charenton-le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 12/635,787

(22) Filed: Dec. 11, 2009

(65) Prior Publication Data
US 2010/0218874 A1    Sep. 2, 2010

(30) Foreign Application Priority Data
Dec. 11, 2008   (FR) ...................................... 08 58474

(51) Int. Cl.
*C09J 5/02*    (2006.01)
(52) U.S. Cl. ........... 156/322; 156/320; 359/642; 359/19
(58) Field of Classification Search .................. 250/345; 156/272.2, 322; 359/19, 642
See application file for complete search history.

(56) References Cited

U.S. PATENT DOCUMENTS

| 2005/0211363 A1* | 9/2005 | Weder ............................. 156/61 |
| 2006/0006336 A1* | 1/2006 | Cano et al. .................... 250/345 |

FOREIGN PATENT DOCUMENTS

| FR | 2 902 105 | 12/2007 |
| WO | WO2007/144308 | 12/2007 |
| WO | WO 2007144308 A1 * | 12/2007 |

\* cited by examiner

*Primary Examiner* — Khanh P Nguyen
*Assistant Examiner* — Vishtal I Patel
(74) *Attorney, Agent, or Firm* — Occhiuti Rohlicek & Tsao LLP

(57) ABSTRACT

A curved multi-layer structure (10) is formed from individual films (1, 2) that are initially flat. The films are firmly bonded to each other along respective facing surfaces. A heat treatment is applied to one or both of the films (1, 2) of the structure so as to cause respective contractions or elongations that are different for the two films at standard use temperatures. A difference between said contractions or elongations causes the curvature of the multi-layer structure. The structure thus has a permanent curved shape, without contact between compression-forming instruments and a useful part of the multi-layer structure being necessary. The multi-layer structure can then be applied onto a curved substrate without causing any tears or ripples.

11 Claims, 1 Drawing Sheet

METHOD OF APPLYING MULTI-LAYER STRUCTURE ONTO A CURVED SUBSTRATE

CROSS-REFERENCE TO RELATED APPLICATIONS

This application claims priority to French Patent Application No. 08 58474, filed Dec. 11, 2008, the content of which is hereby incorporated by reference in its entirety.

The present invention relates to a method of applying a multi-layer structure onto a curved substrate.

In many manufacturing methods, it is necessary to apply a film that is initially flat onto a substrate that is curved. Such an operation can cause defects in the film, such as stretching, ripples or tears. Such defects are even more frequent or more significant when the receiving surface of the substrate onto which the film is applied is not developable or is pseudo-spherical. By pseudo-spherical surface is meant a surface that has non-zero curvatures at certain points of said surface, simultaneously in two perpendicular directions passing through each of these points. A spherical surface is therefore a specific instance of a pseudo-spherical surface. Furthermore, a pseudo-spherical surface can be complex, i.e., the curvatures can vary between different points of such surface.

To reduce the occurrence of such defects, the preforming of the film before applying it onto the curved face of the substrate is known. Such preforming confers a curved shape on the film, which reduces the deformation that it undergoes subsequently when it is applied onto the substrate. Several preforming techniques are used, such as hot embossing, deformation by application of fluid or gas pressures that are different on each side of the film, or compression of the film between two deformable membranes.

Those of these techniques which require that preforming tools come into contact with the film, produce scratches on the film, friction marks, cracks or peeling of coatings that might be present on the film. Such defects reduce the quality of the manufactured product and can exclude it from use for certain applications, particularly in the optical and ophthalmic fields, which have high quality requirements.

Furthermore, the preforming methods that use different pressures applied on the two faces of the film do not allow for sufficient control of the curved shape that is provided to the film. In other words, after preforming the film can still have a shape that is far from that of the receiving surface of the substrate. Its application onto the substrate then causes further defects in the film.

Finally, most of the known preforming methods produce stresses within the film. Such stresses tend to bring the film back to an intermediate shape between its initial flat shape and its shape just after preforming. For this additional reason, there is little control over the final shape of the film. Furthermore, it can evolve over a very long period, which can even continue during the use of the manufactured product incorporating the film. The stresses that are introduced in the film during the preforming stage can then cause subsequent pulling away of the film from the substrate, shrinkage, creep and even tears in the film that appear after a latency period that can vary in length.

An object of the present invention is therefore to propose a new method of applying a multi-layer structure onto a curved substrate, with preforming of the structure that does not present the drawbacks of the methods of the prior art.

To this end, the invention proposes a method in which the curved multi-layer structure is obtained from at least two individual films that are initially flat. This method comprises the following steps:

/1/ forming the multi-layer structure so that the films remain firmly bonded to each other along respective facing surfaces, as long as a temperature of the structure is below a failure temperature; and /2/ applying a heat treatment to at least part of the structure, with a maximum temperature of the heat treatment that is below the failure temperature, so that the two films have different respective contractions or elongations after cooling of the structure to a use temperature.

The difference between the respective contractions or elongations of the films thus produces a curvature of the multi-layer structure. In particular, the multi-layer structure may be pseudo-spherical after the heat treatment in step /2/.

Hereafter, the term contraction only will be used, it being understood that it also comprises an elongation, considered algebraically as a contraction of opposite sign.

A step /3/ of the method according to the invention, which is carried out after step /2/, consists of applying the multi-layer structure to a curved face of the substrate.

Thus, in a method according to the invention, the curvature of the structure after step /2/ results from respective contractions of the films that are produced by heat treatment. No preforming tools, which would stress the structure, are therefore necessary. In this way, the formation of defects on the films by friction or crushing, which would be produced during preforming, is avoided. The quality of the films is thus conserved. By heat treatment is meant any purposeful variation in temperature of at least part of the structure. In particular, the heat treatment may comprise the heating or simply cooling of at least part of the structure.

Another advantage results from the use according to the invention of a heat treatment to produce the curvature of the structure. Heat treatment can reduce internal stresses that might be present in the films, so that the films are in a superior state of mechanical equilibrium at the end of the heat treatment. The films then have improved dimensional stability, so that the curved shape provided to the film is more permanent. In other words, the shape that is provided to the film by the method according to the invention is capable of changing subsequently to a very limited extent.

Furthermore, a method according to the invention is particularly simple to implement, and does not require any complex, expensive preforming tools such as a press. A heating tool such as an oven or furnace is sufficient.

During the heat treatment in step /2/, the temperature of the multi-layer structure remains below the failure temperature, so that the cohesion of the multi-layer structure is not affected. Thus, the films are permanently bonded to each other as of step /1/. This bond, together with the difference between the respective contractions of the two films, produces the curvature of the structure.

In a first embodiment of the invention, the contraction of at least one of the films in the structure may result at least partly from the thermoelastic behaviour of the film. In this case, the multi-layer structure is formed during step /1/ at an initial temperature that is higher than the use temperature. Furthermore, the heat treatment in step /2/ comprises a cooling of the structure to below the initial temperature. The contraction of the film then occurs mainly during the cooling of the structure, and corresponds to the thermal expansion coefficient(s) of the material(s) constituting the film.

In a second embodiment of the invention, the contraction or elongation of at least one of the films in the structure may result at least partly from a relaxation of stresses that are initially present in the film. The heat treatment in step /2/ is therefore capable of producing the relaxation of these stresses.

Optionally, this second embodiment of the invention may also comprise a prior heat treatment of at least one of the films, which is carried out before step /1/. Such prior heat treatment may be intended to reduce the relaxation of the film that is subsequently produced by the heat treatment in step /2/. In this way, a difference between the amplitude of the stresses that are present in the films in the multi-layer structure just before step /2/ can be increased or adjusted, to obtain respective contractions of the films after step /2/ that produce the desired curvature of the multi-layer structure.

According to a first improvement of the second embodiment of the invention, the films in the multi-layer structure may have different respective temperatures during at least part of the heat treatment in step /2/. Such temperature differences between the films cause relaxations of the films, and therefore contractions that differ from one film to another.

According to a second improvement, separate zones of at least one of the two films in the multi-layer structure may have different respective temperatures during at least part of the heat treatment in step /2/. The relaxation of this film that is produced in step /2/ may then vary from one zone to another. In this way, the film can undergo local contractions and/or elongations that vary from one zone to another, allowing for a complex shape to be provided to the structure.

According to a third improvement of the invention, the method may also comprise a stretching of at least one of the films that is carried out before step /2/, so as to permanently modify the stresses that are ultimately present in the film after step /2/.

The invention is more particularly appropriate when at least one of the films in the multi-layer structure comprises at least one organic material, in particular a polymer. The method according to the invention then allows for curvatures that can be significant to be provided to the structure. In this case, and when the use temperature of the multi-layer structure is comprised between 0° C. and 30° C., the maximum temperature of the heat treatment may be greater than or equal to 50° C., preferably greater than 60° C. However, this maximum temperature must also be lower than the decomposition temperature of any one of the materials in the multi-layer structure.

Advantageously, the multi-layer structure may be cut before step /2/ along a given contour, so as to reduce it to a useful portion. Such a cut prevents an unnecessary part of the multi-layer structure, which is intended to be separated from the useful part and then disposed of, from interfering with the deformation of the useful part by stresses extending from one part to another. In this way, the final curvature that is required for the useful part of the structure can be obtained directly at the end of step /2/.

As a result of the preforming that is carried out according to the invention in steps /1/ and /2/, step /3/ can then be performed without producing stresses in the films of sufficient intensity to cause defects.

The curved face of the substrate may be convex or concave. If the receiving face of the substrate is concave, a multi-layer structure that has been curved using the invention can have a sufficient curvature for it to be applied onto the substrate from a first point of contact that is located substantially in the centre of the receiving face. Such application, which starts at the centre of the multi-layer structure and the receiving face of the substrate and continues radially towards a peripheral edge, can be regular and continuous. In this way, no air bubbles are caught between the structure and the substrate, and there is no excessive stretching of the multi-layer structure. The assembly that is obtained is therefore of superior quality.

Finally, the invention can advantageously be used for optical or ophthalmic applications. In the latter case, the substrate may comprise an ophthalmic lens.

Further features and advantages of the present invention will become apparent from the following description of non-limitative examples of embodiment, with reference to the attached drawings, in which.

Figure 1A:
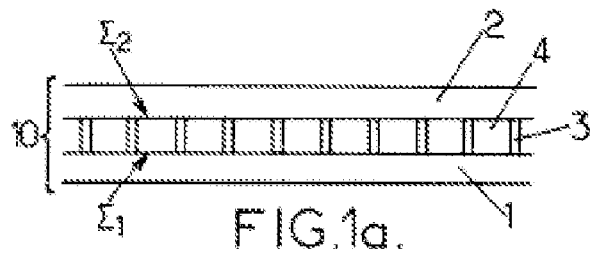
FIGS. 1a and 1b are respectively cross-sectional and plan views of a first multi-layer structure to which the invention can be applied.
Figure 2:
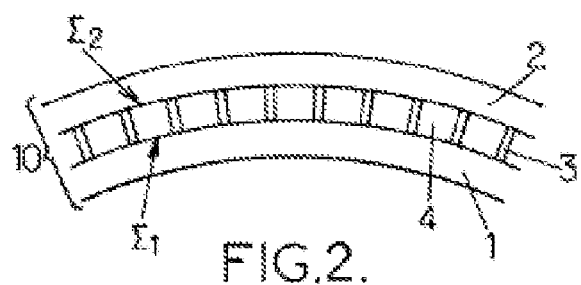
FIG. 2 is a cross-sectional view of the first multi-layer structure in FIGS. 1a and 1b, after implementation of the first steps of a method according to the invention.
Figure 3:
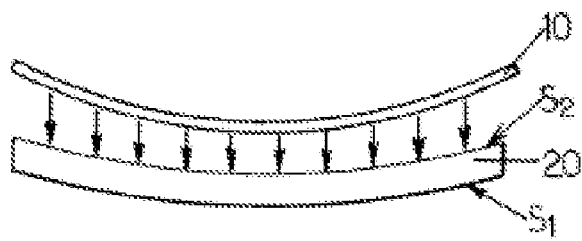
Figure 4:
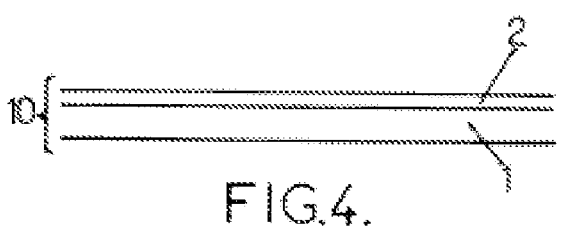
Figure 5:

FIG. 3 follows on from FIG. 2, to show the last step of the method according to the invention; and FIGS. 4 and 5 respectively correspond to FIGS. 1a and 2 for a second multi-layer structure.

For sake of clarity of the figures, the dimensions of the components shown do not correspond to actual dimensions or dimension ratios. Furthermore, identical references given on different figures denote identical components or components with identical functions.

The invention will now be described in detail in the context of an ophthalmic application, but it is understood that this application is used for illustrative purpose only. On reading the description below, a person skilled in the art will know how to implement the invention for any application, optionally by adapting the numerical values mentioned hereafter.

The multi-layer structure now considered is intended for application onto a face of an ophthalmic lens. In a known manner, such an ophthalmic lens may be a semi-finished eyeglass, only one face of which has a final shape. Alternatively, it may be a finished eyeglass that is obtained from such semi-finished eyeglass by machining the other face in an appropriate manner for the eyeglass to produce an ophthalmic correction adapted to a future wearer of the eyeglass. When it is a finished eyeglass, it may still have the peripheral edge of the semi-finished eyeglass, for example a circular margin 60 mm (millimetres) in diameter. It may also already have been trimmed to the dimensions of a seat in a spectacle frame in which it is intended to be assembled.

Such an ophthalmic lens is shown in cross-section in FIG. 3, and numbered 20. The front and rear faces of the lens 20 are identified respectively as $S_1$ and $S_2$. They are pseudo-spherical, with the face $S_1$ being convex and the face $S_2$ being concave. Optionally, at least one of the two faces $S_1$ and $S_2$ may have a complex form.

According to FIG. 1, the multi-layer structure 10 comprises two parallel films 1 and 2. The two films 1 and 2 are integral with each other, being permanently connected along their respective facing surfaces $\Sigma_1$ and $\Sigma_2$. The bond between the two films 1 and 2 can be of different types. According to a first type, one of the two films may have been formed on the other, so that the bond can result from the initial adhesion between the last film formed and the other, which served as a support for its forming. According to other types of bonding, the films 1 and 2 may be welded or soldered to each other by their surfaces $\Sigma_1$ and $\Sigma_2$, or even glued with an intermediate layer of an adhesive material. In any case, the bond between the films 1 and 2 is fixed and permanent as long as the structure has a temperature that is below the failure temperature. In other words, below the failure temperature, the bond can transmit stresses from one film to another through the surfaces $\Sigma_1$ and $\Sigma_2$. The failure temperature of the bond between the two films 1 and 2 depends on the type of bond between them. For example, the failure temperature may be a melting temperature of an adhesive that produces the bond, so that above the failure temperature, the films 1 and 2 can slide relative to each other, parallel to their surfaces $\Sigma_1$ and $\Sigma_2$. For several types of bond such as soldering or welding, the failure temperature of the bond between the films 1 and 2 can be classified as the assembly temperature of the structure 10.

For the specific multi-layer structure 10 in FIG. 1, the bond between the films 1 and 2 comprises a network of walls 3 that extend perpendicular to the surface $\Sigma_1$. These walls form a set of cells 4 that are juxtaposed parallel to the surface $\Sigma_1$. The cells 4 may each be filled with a substance selected elsewhere. The walls 3 may have been made firstly on the surface $\Sigma_1$ of the film 1, acting as a base film, so that they are supported by and integral with the film 1 by their means of formation. The cells 4 are then filled with the selected substance, in an individual or collective manner that is not discussed here. The multi-layer structure 10 is then formed by applying the film 2 onto the tops of the walls 3 opposite the base film, so as to close the cells. The closing film 2 may be soldered, glued or welded to the tops of the walls 3.

The structure 10 is preferably transparent, particularly for the ophthalmic application in question. The films 1 and 2 may each comprise at least one organic material, in particular a polymer. For example, the films 1 and 2 may both be based on polyethylene terephtalate (PET) and be 75 μm (micrometers) and 125 μm thick respectively. In a known manner, such films are normally manufactured by bi-axial stretching, so that they are subjected individually to mechanical relaxation when they are heated. The inventors have noted that in the specific case of PET films, such relaxation produces a positive contraction of the film, that is, a shrinkage or reduction of the film. In a standard manner, this reduction may be between 0.2% and 1%, in particular for a PET film that is heated beyond 100° C. for several hours.

In other embodiments of the invention, the films 1 and 2 of the multi-layer structure 10 may be made up of materials that are different. For example, one of the films may be PET-based and the other one based on polycarbonate (PC), polyimide, cellulose triacetate (CTA), cyclo-olefin copolymers (COC), etc. The effect of the relaxation on the dimensions of the film in question, contraction or elongation, together with the amplitude of such contraction or elongation, varies depending on the material of the film, its production method, its thickness, any stretching already undergone, and the heat balance to which the film has been subject since its production.

Furthermore, it is known that successive heat treatments cause different relaxations, and consequently different contractions or elongations. Normally, successive heat treatments that are applied to the same film cause dimensional variations in the film that have a constant sign and are decreasing in absolute value. Thus, the dimensional variations of a film, in particular a film made from an organic material, that are likely to be produced by a fixed heat treatment, can be reduced by subjecting the film to a prior heat treatment. In other words, the prior heat treatment produces a stabilisation of the film vis-à-vis the subsequent heat treatment.

The relaxation that has just been described for films subjected to a heat treatment is therefore irreversible. It is separate from the reversible elongation that a film undergoes when it is heated, which corresponds to the thermal expansion coefficient of the material forming the film. In this latter case, the film expands when its temperature increases, and shrinks inversely when its temperature decreases, so that the final dimensions of a film that is heated and then returned back to its initial temperature are identical to its initial dimensions, if no relaxation occurs.

Generally, the two aforementioned behaviours of a film, namely its relaxation and its reversible expansion, occur simultaneously during heat treatment, to relative extents that can vary.

According to a first embodiment of the invention, the film 1 with the walls 3 and the filled cells 4 on the one hand, and the film 2 on the other hand, are heated separately to the same assembly temperature, for example 60° C. They are assembled at this temperature to form the structure 10, then cooled to ambient temperature, between 0° C. and 30° C., for example approximately equal to 20° C. This cooling forms the heat treatment introduced by the invention, for this first embodiment.

The assembly by means of which the bond between the films 1 and 2 is made may be of different types. It may take the form of soldering of the tops of the walls 3 with the film 2, or gluing of said tops to the film 2. In the latter case, the film 2 may initially be coated with a layer of an adhesive material, for example a pressure-sensitive adhesive or PSA. The bond that is constructed between the films 1 and 2 is permanent. At the moment that it is formed, each of the films 1 and 2 has dimensions that correspond to the equilibrium of that film at the assembly temperature.

At the end of cooling, each of the two films 1 and 2 has undergone a contraction, and a shear stress field is created in the structure 10, which results from a difference between the respective contractions of the two films. This stress field causes a deformation of the structure 10, resulting in a curved shape of the latter. In the configuration of the structure 10 shown in FIG. 2, the film 1 has undergone a larger contraction than the film 2. It is then extended over at least part of its thickness, and forms the concave face of the structure 10. Conversely, the film 2 is compressed over at least part of its own thickness and forms the convex face. The contractions of the two films 1 and 2 may be bi-axial, so that the structure 10 may have a pseudo-spherical form. When the contractions of each film are isotropic parallel to the films, the structure 10 becomes spherical.

It is understood that the curvature of the structure 10 results from dimensional variations in the films that are combined with the production of stresses in the films. A person skilled in the art will understand that these are two aspects of the same phenomena implemented, the stresses being balanced by the dimensional variations of the films, within the structure in its final state.

In this first embodiment of the invention, the contractions of the films 1 and 2 may be largely reversible. This is the case if the curvature of the structure 10 disappears almost entirely when the structure is heated again. The curvature of the structure 10 then results mainly from the thermoelastic behaviours of the respective materials of the films 1 and 2 during the cooling of the structure 10 after assembly.

Table 1 below shows the radius of curvature values of the structure 10 when the two films 1 and 2 have identical thicknesses, but are distinguished by their respective Young modulus E and thermal expansion coefficient $\alpha$ values. The heat treatment applied is essentially the cooling of the structure from an assembly temperature of 60° C. to 20° C.

TABLE 1

| Film 2: ↓ | Film 1: → | | |
|---|---|---|---|
| | $E = 80$ MPa<br>$\alpha = 19 \cdot 10^{-6\circ}$ C.$^{-1}$ | $E = 75$ MPa<br>$\alpha = 22 \cdot 10^{-6\circ}$ C.$^{-1}$ | $E = 76$ MPa<br>$\alpha = 23 \cdot 10^{-6\circ}$ C.$^{-1}$ |
| $E = 80$ MPa<br>$\alpha = 19 \cdot 10^{-6\circ}$ C.$^{-1}$ | 0 | 156 mm | 91 mm |
| $E = 75$ MPa<br>$\alpha = 22 \cdot 10^{-6\circ}$ C.$^{-1}$ | 156 mm | 0 | 208 mm |
| $E = 76$ MPa<br>$\alpha = 23 \cdot 10^{-6\circ}$ C.$^{-1}$ | 91 mm | 208 mm | 0 |

According to a second embodiment of the invention, the structure 10 may be assembled at ambient temperature, comprised between 0° C. and 30° C., for example 20° C., so that it initially has a flat shape at this temperature. It is then subjected to the heat treatment introduced by the invention. This comprises heating, for example to a temperature that may be comprised between 60° C. and 120° C., followed optionally by maintenance at this temperature for a period that may be comprised between 15 minutes and 2 hours, and then cooling back to ambient temperature. During this treatment, each of the films 1 and 2 undergoes a different relaxation, and the structure 10 ultimately has a curved shape. Its curvature depends on the difference between the respective algebraic contractions of the two films that occurred during heat treatment.

Depending on the respective thicknesses of the films 1 and 2, and when they are made from PET, radii of curvature comprised between 70 mm and 230 mm have been obtained for the structure 10 using this second embodiment of the invention.

Optionally, one of the two films may be subjected to prior heat treatment before being assembled with the other film. It is then already partly stabilised before assembly, so that its dimensions vary less during the subsequent heat treatment, carried out after assembly. The two films then have a larger difference between their respective algebraic contractions, which occur after assembly of the structure 10. A greater curvature can thus be provided to the structure 10.

Generally, it may be advantageous to subject at least one of the two films 1 and 2, if not both, to heat treatments before they are assembled to each other, to improve the reproducibility of the ultimate curvature of the structure 10. A person skilled in the art will know how to determine the specifications for such heat treatments depending on the initial degree of relaxation required for each film, and the level of reproducibility of the curvature that is ultimately provided to the structure 10.

It is also possible to purposely introduce stresses in one or other of the films in the structure, before the films are assembled together to form the multi-layer structure, in order to mechanically generate at least one component of the ultimate curvature of the structure. If the films are brought into contact by rolling, it is possible to stretch at least one of the films in the direction of rolling by means of longitudinal and/or transverse tension, for example using fixed jaws.

The films 1 and 2 may initially be provided with dimensions that are greater than the dimensions of the multi-layer structure in an end product. The films are therefore cut into separate portions that each correspond to a unit of a final article. For economic reasons of industrial implementation, several treatments may be applied to each film before it is cut. For example, the formation of the network of walls 3 on the film 1, the filling of the cells 4, or the depositing of functional coatings on the film 2 may take place before the films 1 and 2 are cut. Similarly, the two films 1 and 2 may be assembled before cutting, so that the multi-layer structure is formed with initial dimensions that correspond to several final articles that will be produced.

Figure 1B:
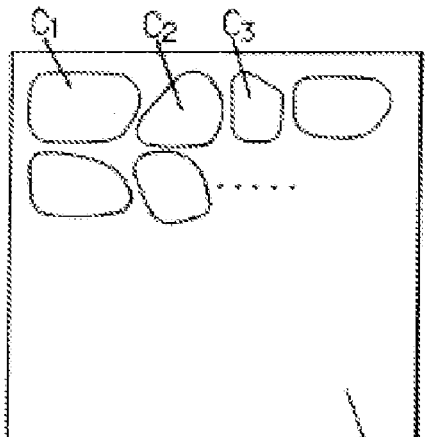

In this case, the multi-layer structure 10 may be cut preferably before the heat treatment that provides on it its curved form. It is then cut along a given contour that corresponds to a unit of finished article. Depending on the dimensions of the films 1 and 2, several contours may be inscribed in the sheets of the films 1 and 2, corresponding to different units of finished articles. Optionally, the contours may vary from one unit of article to another. FIG. 1b shows an assembled multi-layer structure 10 in which several cutting contours have been determined. Each of these contours, which are marked $C_1$, $C_2$, $C_3$, etc., corresponds substantially to an ophthalmic eyeglass seat in a frame of a pair of spectacles. They each separate a useful portion of the structure 10. By contour corresponding to a unit of finished article is understood a contour that corresponds to the final edge of the portion of the structure 10 that is ultimately comprised in this unit of article. However, the contour $C_1$, $C_2$, $C_3$, etc. of each useful portion may have a peripheral margin relative to the final edge of the portion in the end product. Such margin may be useful, in particular, during the trimming of the eyeglass if the portion is glued to the finished eyeglass before trimming is carried out.

The maximum temperature of the structure 10 during the heat treatment for curving is lower than the failure temperature. It is obviously also lower than any decomposition temperature of the films 1 and 2 themselves. As a result, the cohesion of the structure 10 is maintained. This heat treatment can be carried out using heating means that are normally available. These may be an oven, a furnace, an infrared lamp, etc.

According to a first improvement, the two films 1 and 2 may have respective temperatures that are different during the heat treatment that produces the curvature of the structure 10. For example, the structure 10 may be placed horizontally on a hot plate, resting on one of the two films 1 or 2 that is then on the bottom. A gaseous flux may then be sent in contact with the film located on top, so as to create a difference between the respective temperatures of the two films during the heat treatment. The upper film, which is thus taken to a lower temperature, undergoes less relaxation during the heat treatment. Its dimensions therefore vary to a lesser extent. The difference created in this way between the temperatures of the two films during the heat treatment contributes to increasing the curvature of the structure 10.

According to a second improvement, the structure 10 may be heated to temperatures that vary between different zones. These zones are adjacent parallel to the structure 10, and correspond to variations in the power of the heating or cooling that are concentrated on them. Zones of the structure 10 that are thus heated to higher temperatures than neighbouring zones thus undergo greater relaxation than the latter. In this way, the curvature provided to the structure 10 by the heat treatment varies between the zones, and the structure 10 ultimately has a complex form. For example, when the substrate 20 is a progressive lens the front face $S_1$ of which defines the progression of the refractive power, and the structure 10 is intended to be applied to this face $S_1$, it may be advantageous to provide the structure 10 with a greater curvature in the part of the structure that will cover the near-vision zone of the lens. The application of the structure 20 onto the face $S_1$ of the lens will be further improved.

Generally, the curvature that has been provided to the multi-layer structure 10 using the preforming according to the invention is advantageously similar to the curvature of the curved face of the substrate 20 onto which the structure 10 is intended to be applied. The application of the structure 10 onto this face, so that the face of the substrate 20 and the structure 10 are in contact at all points of the face of the substrate, does not then produce excessive stresses in the structure. No tears or folds are therefore formed in the structure 10. For example, the structure 10 is applied onto the concave face $S_2$ of the substrate 20 (FIG. 3). Optionally, this application may consist of gluing the structure 10 to the substrate 20.

FIGS. 4 and 5 show another application of the invention. The film 1 may incorporate a base film that comprises at least one polymer, for example PET, and the film 2 may comprise a varnish that is deposited on the film 1. During the heat treatment, the film 1 undergoes less relaxation than the film 2, so that the film 1 becomes the concave face of the structure 10, and the film 2 of varnish becomes the convex face.

According to yet another application of the invention, the film 1 may also incorporate a base film that comprises at least one organic material, for example PET, and the film 2 may comprise at least one mineral material. For example, the film 2 is itself a stack of several layers that has been formed on the film 1. It is intended to provide the film 1, and subsequently the ophthalmic lens 20, with additional properties such as shock resistance, an anti-reflective function, a dirt-repellent function, scratch resistance, a hydrophobic function, etc. In a known manner, the anti-reflective function, which consists of reducing the intensity of the light reflected by the lens, is achieved by arranging a succession of thin layers with alternately low and high light refraction index values. The thin layers with high light refraction index values are generally made from a mineral material, such as titanium oxide ($TiO_2$), for example. Due to the presence of such mineral layers in the film 2, the film has dimensional variations, during heat treatment, that are much smaller than those in the film 1. After implementation of the invention, the film 1 once again constitutes the concave face of the structure 10.

It is understood that the embodiments of the invention that have been described in detail may be amended while retaining at least some of the advantages that have been mentioned. In particular, the nature of the films 1 and 2, together with the type of bond connecting them to each other within the structure 10, may vary. In each case, a person skilled in the art will be able to adapt the parameters of the heat treatment that produces the desired curvature of the structure 10. Optionally, a series of successive tests could be carried out to this end, in order to progressively adjust the parameters of the heat treatment.

The invention claimed is:

1. Method of applying a multi-layer structure onto a substrate, the multi-layer structure being obtained from at least two initially flat individual films, said method comprising the following steps:
/1/ providing the multi-layer structure configured so that said films remain firmly bonded to each other along respective facing surfaces ($\Sigma_1, \Sigma_2$), as long as a temperature of the structure is below a failure temperature;
/2/ applying a heat treatment to at least part of the multi-layer structure, with a maximum temperature of the heat treatment that is below the failure temperature, so that due to the particular application of the heat treatment the two films have different respective contractions or elongations after cooling of the structure to a use temperature, and a difference between said respective contractions or elongations of the films producing a curvature of the multi-layer structure, whereby the heat treatment of step /2/ itself produces the curvature of the structure, then
/3/ applying the multi-layer structure onto a curved face ($S_1$) of the substrate, the substrate comprising an ophthalmic lens,
the multi-layer structure is formed during step /1/ at an initial temperature that is higher than the use temperature; and
the heat treatment in step /2/ comprises the cooling of said multi-layer structure to below said initial temperature, and at least one of the films has, after said heat treatment, a contraction resulting at least partly from the thermoelastic behaviour of said film.

2. Method according to claim 1, in which the multi-layer structure is pseudo-spherical after the heat treatment in step /2/.

3. Method according to claim 1, in which at least one of the films comprises at least one organic material, particularly a polymer.

4. Method according to claim 3, in which the use temperature of the multi-layer structure is comprised between 0° C. and 30° C., and the maximum temperature of the heat treatment is equal to or greater than 50° C., preferably greater than 60° C.

5. Method according to claim 1, in which the multi-layer structure is cut before step /2/ along a given contour ($C_1, C_2, C_3$, etc.) so as to reduce said structure to a useful portion.

6. Method according to claim 1, in which a first one of the two films incorporates a base film comprising at least a first organic material, particularly a first polymer, and holds on a face of said base film a network of walls extending perpendicular to said face and forming a set of cells juxtaposed parallel to said face, and the second film comprises at least a second organic material, particularly a second polymer, and in which step /1/ comprises the application of the second film onto the tops of the walls opposite the base film, so as to close the cells.

7. Method according to claim 1, in which one of the films incorporates a base film comprising at least one polymer, and the other film comprises a varnish.

8. Method according to claim 1, in which one of the films incorporates a base film comprising at least one organic material, and the other film comprises at least one mineral material.

9. Method according to claim 1, in which said face ($S_1$) of the substrate is concave.

10. Method according to claim 1, in which the multi-layer structure is cut before step /2/ along a given contour ($C_1, C_2, C_3$, etc.) and the given contour ($C_1, C_2, C_3$, etc.) corresponds substantially to a seat for an ophthalmic eyeglass in a frame of a pair of spectacles.

11. Method according to claim 1, also comprising a stretching of at least one of the films carried out before step /2/, so as to permanently modify the stresses that are ultimately present in said film after step /2/.

* * * * *